Patented Jan. 20, 1948

UNITED STATES PATENT OFFICE 2,434,710

PROCESS OF TREATING ALKALINE EARTH HYDRATES OR OXIDES, AND THE RESULTING PRODUCT

Leonard John Minnick, Cheltenham, Pa., assignor to G. & W. H. Corson, Inc., Plymouth Meeting, Pa., a corporation of Delaware No Drawing. Application May 18, 1944,
Serial No. 536,200

15 Claims. (Cl. 23—186)

The present invention relates to a process for treating alkaline earth hydrates or oxides to render them substantially colorless, and to the resulting products, and more particularly it relates to the production of a substantially white alkaline earth hydrate in which the ferric iron, causing discoloration of the alkaline earth compound, has been converted into a compound imparting substantially no coloration to the product.

This application is a continuation-in-part of my prior application Serial Number 371,414, filed December 23, 1940, which in turn is a continuation of my prior applications Serial Numbers 265,828 and 265,829, filed April 3, 1939.

The principal object of the present invention is to provide a simple and economical process by which an alkaline earth hydrate or oxide discolored by ferric iron may be converted into a substantially colorless product.

A further object of the invention is to provide a process by which a discolored alkaline earth hydrate or oxide containing ferric iron may be treated by a suitable reagent which will convert the ferric iron into a compound imparting substantially no coloration to the product.

Other objects, including the production of a novel product, namely an alkaline earth hydrate in which at least a portion of the ferric iron thereof has been converted into a compound imparting substantially no coloration to the product, will be apparent from a consideration of the specification and claims.

The process of the present invention is applicable for the treatment of the various alkaline earth hydrates and oxides, which term includes the hydrates and oxides of calcium, magnesium, barium, and strontium. The hydrates or oxides treated may be obtained from any source or may result from any of the various processes furnishing the compound. Mixtures of hydrates and/or oxides of different alkaline earth metals or mixtures of hydrates and oxides of the same alkaline earth metal may also be treated by the process. Since lime is the most abundant of the alkaline earth hydrates or oxides, the invention will be described particularly in connection with the bleaching of lime but it is to be understood that the conditions and the like recited in connection with the treatment of lime are generally applicable for the treatment of other alkaline earth hydrates or oxides. The term "lime" as used herein includes the usual products known to the trade by that term such as dolomitic lime, high calcium lime, and other products of varying percentages of calcium and magnesium, known as magnesium lime.

Heretofore, the so-called bleaching of lime has resided in treating the lime, either before or after hydration, with an agent capable of physically neutralizing or masking the natural color of the lime. Such an agent may be of the type of bluing, or may be a composition capable of coating the particles of lime with a thin gelatinous film. Such a coating is semi-opaque and white, and serves to mask the color of the lime in a purely physical manner, and may, in effect, therefore, appreciably reduce the yellowish color encountered in the lime. Thus, the use of a gel composed of calcium acetate and aluminum hydroxide, formed by adding aluminum acetate to the lime, has been suggested. The gel produces, in a physical sense, a coating of particles which serve to mask and, therefore, bleach the lime. If products so treated are ground, the grinding destroys the physical film, and the resulting color of the product is substantially the same as that of untreated material.

The present invention is to be contrasted with these attempts where the color has been masked physically, since in accordance herewith the ferric iron, which in very small percentages, even tenths of per cent., causes discoloration of the product, is converted into a compound imparting substantially no coloration to the product.

The process involves the treatment of the hydrate or of the oxide, either during or after hydration, with a non-color-imparting inorganic compound of the type hereinafter defined and referred to herein as the "reagent." As will appear, if the compound contains an available $SO_3$= ion, that compound may react as a reagents, like the other reducing agents, to convert the ferric iron into ferrous iron, which imparts substantially no coloration to the product; or that compound may react to convert the ferric iron into a substantially colorless complex compound. The type of reaction obtained when a compound containing an available $SO_3$= ion is employed in the process, depends, as will be pointed out hereinafter, on the physical conditions employed in the process.

Whether the process involves the treatment of the hydrate or of the oxide during or after hydration with the reagent, bleaching of the product may be brought about by the use of temperatures obtainable at atmospheric pressure, if digestion is continued for a sufficient time to permit the reaction, or by the use of a more elevated temperature generally obtained with the aid of elevated pressure, in which case the time of reaction is materially shortened. When the reagent is present with the oxide at the time of hydration, the temperature created in the hydration step may supply or supplement the heat required. The use of an elevated temperature, obtained with the aid of elevated pressure, and the treatment of the oxide with the reagent, during hydration, are both recommended since the process is then completed in a relatively short time. It is to be understood that the term "hydration" employed herein does not necessarily refer to complete hydration since in the case of the relatively unreactive alkaline earth oxides the treated product may contain some of the alkaline earth compound in oxide form. Such a product, as well as the completely hydrated product, is included herein, when reference is made to the treated product, within the term "hydrate" or "hydrated product."

The reagent is an inorganic compound which does not impart coloring matter to the product and is not converted into a compound coloring the product. The non-color-imparting inorganic compound or reagent used in accordance with the present invention is selected from the group consisting of compounds (viz., acids and salts) having sulphur and oxygen, phosphorus and oxygen, and arsenic and oxygen in the anion thereof, said anion being in a state of incomplete oxidation, a mercurous salt, a stannous salt, and a cyanide. This group of compounds applicable for use includes a large number of compounds, it being only necessary to mention a few of the group as follows: a sulphite, an arsenite, a thiosulphate, a hydrosulphite, a phosphite, a hypophosphite, a stannous salt, a mercurous salt, and potassium cyanide. Any appropriate stannous or mercurous salt may be used. Obviously, the compound containing an anion of the group recited may be employed as the acid, or in the form of a water-soluble salt, such as the alkali metal (sodium, potassium) salt, or as a substantially water-insoluble salt, such as any suitable alkaline earth metal or heavy metal salt. Of the compounds having such an anion, the use of a sulphite is preferred, the bisulphites being included herein within the term "sulphites." Preferably, the reagent will be a salt of an alkaline earth compound corresponding to that of the hydrate or oxide treated and containing sulphur and oxygen in the anion, or the acid containing such anion, is employed, since when these compounds are used no extraneous cation is added to the product.

The reagent may be mixed with alkaline earth oxide before the water of hydration is brought into contact therewith, or the reagent may be dissolved or suspended in the water to be used for hydration, either before or at the time the oxide and water are mixed. In the case the reagent is added to alkaline earth hydrates, it may be added to the dry hydrated product, or it may be suspended in water. Furthermore, any compound supplying anions of the type described to the solution may be employed, for example, sulphur dioxide may be passed into water, and the resulting solution employed in the treatment. Advantageously, the sulphur dioxide gas may be passed into the water to be used for hydration, either before or at the time the oxide and water are mixed. The water of hydration may be provided by the condensation of steam and in this case sulphur dioxide gas may be associated with the steam prior to condensation.

The amount of reagent employed, based on the weight of the alkaline earth hydrate, may be small, since the iron to be converted is present in the alkaline earth compound in very small amounts. In any particular case, it will be desirable to add sufficient reagent to convert substantially all of the ferric iron into a substantially colorless compound, but even if smaller amounts than those required for complete reaction are employed, a bleaching effect to the extent of the conversion is obtained, and in some instances, this may be sufficient. The amount of reagent required in any particular case will depend upon the amount of iron which it is desired to convert into the substantially colorless compound and the efficiency of contact between the hydrate or oxide and the reagent. In general, the amount required if maximum efficiency of contact is afforded will be 1% or less, based on the total weight of the hydrate. For example, a lime containing 0.4% of iron has been rendered substantially colorless by the use of 0.2% to 0.5% sulphur dioxide under conditions resulting in the conversion of the iron into a substantially colorless complex compound. In typical case, using sodium thiosulphate as the reagent, the amount of thiosulphate pentahydrate employed will generally be between 0.5% and 1.0% (based on the lime) in the treatment of lime containing approximately 0.4% of iron (as $Fe_2O_3$). It will, of course, be understood that equivalent amounts of other compounds selected from the defined group may be employed. The use of an excess of the reagent over that required does not deleteriously affect the product, and it is to be understood that any amount desired may be employed in spite of the fact that the excess may constitute a waste of material.

The bleaching of the alkaline earth hydrate or oxide by the conversion of ferric iron in the material into ferrous iron will be first discussed as applicable to the reagents which function as reducing agents. As previously pointed out, if the reagent selected is a compound furnishing an available $SO_3$= ion, the alkaline earth hydrate or oxide may be bleached by reduction of the ferric iron to ferrous iron or by conversion of the ferric iron into a substantially colorless complex compound containing ferric iron, depending in general on the conditions encountered in the process. Subsequently, the conditions favoring the formation of the substantially colorless complex compound by a compound furnishing an available $SO_3$= ion will be discussed. The process of the present invention broadly includes the treatment of the alkaline earth hydrate or oxide with the reagent to form a bleached product by the conversion of the ferric iron into a compound imparting substantially no coloration to the product irrespective of the mechanism of the reaction, that is, irrespective of whether the ferric iron is reduced to ferrous iron, or of whether the ferric iron is converted into a substantially colorless complex compound containing ferric iron by a compound furnishing an available $SO_3$= ion.

While the reduction of ferric iron to ferrous iron in neutral or acid solution is well known, the reduction obtainable in accordance with the present invention takes place in a medium that is distinctly alkaline. Therefore, the ferric iron, for all practical purposes, is not in solution and is not available for reduction in the usual sense. For these reasons, special conditions are required in order to obtain the reduction of ferric iron to ferrous iron in accordance with the present invention. Thus, it is necessary that the reagent functioning as a reducing agent be mixed with the alkaline earth hydrate or oxide and water; that the mixture, whether the alkaline earth compound be unhydrated, partially hydrated, or hydrated, be subjected to an elevated temperature; and that the mixture be digested to convert at least a portion of the ferric iron present into ferrous iron. The time of digestion, as will hereinafter appear, depends upon the temperature employed in the process.

As previously stated, the reduction may take place at moderately elevated temperatures, for example about 180° F. to 212° F., or more advantageously at higher temperatures, such as may be obtained by the application of appropriate pressures to the reaction mass. When moderate temperatures are employed, it is necessary, in order to bring about the reaction to an appreciable extent, to digest the mass for an extended time, the length of time depending upon the temperature employed, the activity of the reagent, and the amount of ferric iron to be converted. The treatment may be carried out after the hydration has been completed, or the reagent may be present at the time of hydration. Since, however, no appreciable reduction of iron occurs during hydration, usually obtainable at atmospheric pressures, the mass in both cases may require digestion for a period of several hours, with the continued application of heat. If a complete conversion is desired, and a relatively weakly reducing reagent is employed, the digestion may require several days. When the process is carried out at atmospheric pressure, any suitable container which may be heated during the necessary digestion period may be employed.

Preferably, the process is carried out by establishing a pressure on the reaction mass sufficient to raise the temperature appreciably above the boiling point of water. In general, the higher the temperature, the shorter will be the time of reaction; and while temperatures corresponding to pressures as low as 15 to 20 pounds per square inch gage pressure may be employed, the use of higher temperatures, for example, temperatures corresponding to pressures in excess of 100 pounds per square inch is recommended. Preferably, a gage pressure of several hundred pounds per square inch, for example 200 to 400 pounds is generally employed for the most satisfactory results. When temperatures corresponding to such pressures are employed, the process is completed in a few minutes, depending upon the particular temperature used. The use of pressure is advantageous, both when the hydrate is treated and when the reagent is present with the oxide at the time of hydration. Obviously, if desired, the oxide may be hydrated in the presence of the reagent at a moderately elevated temperature, and thereafter subjected to treatment at a higher temperature obtained, for instance, by the use of an elevated pressure, or alternatively, the oxide may be hydrated in the presence of the reagent at a relatively high temperature and the digestion subsequently carried out at a moderate temperature.

While as pointed out, the alkaline earth compound may be treated with the reagent after its hydration, the reaction takes place with much greater difficulty than is encountered when the reagent is associated with the oxide prior to its hydration. This is understandable, since it has been found that, when the calcined material reacts with water, a fresh surface of iron oxide is exposed and that the freshly released iron oxide is freer to react with the reagent than is the case when the oxide has had an opportunity, after hydration, to revert to a stable and relatively inert form.

In the preferable case, the oxide is hydrated at temperatures obtained from the use of gage pressures of from 200 to 400 pounds per square inch (specifically 300 pounds) in the presence of the reagent so that at least a portion of the iron becomes reduced during the hydration period. The upper limit of pressure applicable for use is determined by economic factors and the equipment available, rather than by the requirements of the process. In addition, the heat from the hydration reaction may supply, or supplement, the heat required. The reduction reaction is completed after the hydration by digesting the material at the elevated temperature for a sufficient time to permit the completion of the reaction to the point desired.

As will hereinafter appear, when a compound furnishing an available $SO_3^=$ ion is the reagent selected and is present prior to the completion of the hydration of the oxide, the use of temperature and pressure conditions hereinabove set forth favors the conversion of the ferric iron into a substantially colorless complex compound including ferric iron, and the use of the higher temperature and pressure conditions results in the formation of said complex compound, rather than in the reduction of the ferric iron to ferrous iron.

In the case of a dolomitic lime hydrate of the trade, in which the calcium is the form of the hydroxide and the major portion of the magnesia is unhydrated, the reduction of the ferric iron may accompany any hydration of magnesia that is initiated, by subjecting the material to an elevated temperature in the presence of water or water vapor. While this reaction proceeds, any iron that may be associated with the calcium may likewise be reduced, although at a much slower rate than the rate of reduction of the iron that is associated with the unhydrated magnesium oxide. Since in some instances it requires several hours to hydrate the magnesium oxide, even at a gage pressure of 100 pounds per square inch, or more, it can be seen that a good conversion of ferric iron can be obtained in the time necessary to hydrate the product.

In the special case where the ferric iron is converted into a substantially colorless complex compound including ferric iron by a compound furnishing an available $SO_3^=$ ion, the compound must be added to oxide prior to the complete hydration. In general, it will be advantageous to have the $SO_3^=$ compound present at the beginning of the hydration step. The reaction to form the complex compound is conducted at an elevated temperature sufficient to cause the reaction, generally above the boiling point of water at atmospheric pressure. The temperature required may be provided by any suitable expedient, but the use of an elevated pressure to furnish the appropriate temperature will generally be employed.

While the precise chemical character of the complex compound formed is not definitely known, it is believed that iron, alkaline earth metal, and the anion furnished by the compound containing an avaialble $SO_3^=$ ion enter into the reaction. The indications are that a possible complex compound formed by the process of the present invention includes, in addition to the alkaline earth metal, ferric iron and the $SO_4$ radical since chemical analyses in numerous instances have shown that the iron is in the ferric state and that no sulphite radical is present in the compound, but this and the following explanation is to be understood as not restricting the invention.

For the purposes of illustration, the formation of the complex compound may be set forth in the following symbolic manner, where A, B, and C represent the iron, alkaline earth metal, and $SO_3=$ ion entering into the reaction:

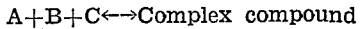

$$A + B + C \leftrightarrow \text{Complex compound}$$

The reaction may take place in steps, that is, two of the components may first react followed by reaction of the resulting product with the third reactant, or the three constituents may, at least theoretically, react at the same time. Regardless of the actual mechanism of the reaction, it is necessary, in order to obtain a large amount of conversion of the iron into the complex compound, with a relatively high rate of reaction, to set up conditions which favor the formation of the complex compound. Extensive experiments have shown that two conditions are advantageous in the conversion of the desired amount of iron into the complex compound. The first condition is the use of a relatively high temperature, that is, a temperature higher than that attainable at atmospheric pressure, the desired temperature, therefore, advantageously being obtained by the use of pressure. The second condition favoring the completion of the complex formation is that the reaction shall take place when the iron is in the most available form for reaction, which condition exists at the time of hydration of the oxide. Therefore, the $SO_3=$ ion is made available for reaction with the other components before completion of the hydration.

The use of a relatively high temperature greatly accelerates the rate of reaction, so that in the time necessary for the hydration of the oxide, all, or at least the desired amount, of the iron will be converted into the complex compound. Since the reaction involving the formation of the complex compound takes place in a medium containing oxide, and water or water vapor, the desired temperature of the mass may conveniently be obtained by generating an elevated steam pressure either from the reaction mixture itself, or from an external source. Thus, as the steam pressure and corresponding temperature are raised, the formation of the complex compound is favored; and in general the higher the temperature that is employed, the greater the ease with which the reaction proceeds towards completion. Furthermore, since formation of the complex compound accompanies the hydration of the oxide, it is understandable that incomplete conversion of the iron is obtained when the rate of the complex formation reaction is considerably slower than the rate of the hydration of the oxide. Hence, as the temperature is reduced, a temperature is finally reached where an incomplete reaction of the iron takes place. While it may not be necessary to convert all of the iron into the complex compound to render the product substantially colorless, the amount to be converted is determined by the degree of whiteness desired in the finished hydrate, and also upon the amount of iron present. Since the degree of whiteness of the hydrate desired may be selected arbitrarily, and since the iron content may vary over a considerable range, it is evident that the minimum temperature at which the reaction may be carried out cannot be specified with exactness, but it is always at an elevated temperature and usually above 212° F., the boiling point of water at atmospheric pressure. While in some instances, a temperature corresponding to a gage pressure as low as 15 to 20 pounds may be used, a temperature corresponding to a pressure in excess of one hundred pounds per square inch gage pressure, preferably a pressure of several hundred pounds is generally employed for the most satisfactory results, since under these conditions, the temperature is adequate for substantial completion of the reaction with reasonable speed. The use of a temperature corresponding to a pressure of 200 to 400 pounds per square inch gage pressure, specifically 300 pounds per square inch gage pressure, is recommended. The upper limit of pressure applicable for use is determined by economic factors and the equipment available, rather than by the requirements of the process.

Referring to the second condition, namely, that the compound furnishing the $SO_3=$ ion is available for reaction prior to the completion of the hydration, it has been found when the oxide reacts with water, a fresh surface of iron oxide is exposed, and that the freshly released iron oxide is free to react to form a complex compound readily, especially at elevated temperatures. Furthermore, since the complex compound is believed to possess an $SO_4$ radical, it is evident that the formation of a complex compound takes place between the iron, alkaline earth metal, and $SO_3=$ ion which is subsequently oxidized or freshly formed $SO_4$ radical. It is significant that the addition of a compound furnishing an $SO_4=$ ion will not serve to discolor the product; and, that once the hydration is completed and the iron has had an opportunity to develop into a stable and relatively inert constituent, the complex formation will not take place. It is for these reasons that the reaction to form the complex compound should take place coincidently with the hydration reaction. It will be understood that it is not necessary to hydrate the oxide completely, and in this case the iron converted will correspond to the amount of iron associated with the oxides that are hydrated; for example, it is not necessary to hydrate completely the magnesium oxide of a magnesium or dolomitic lime. In the use of a magnesium or dolomitic lime, it is possible to partially hydrate the product, that is, to hydrate the calcium oxide before the compound is associated with the lime. In this case, the compound is associated with the lime at the time the magnesium oxide is hydrated, and it is possible to obtain a decrease in color proportional with the conversion of the iron which is liberated when the magnesium oxide hydrates at the elevated temperatures. The dolomitic hydrate of the trade, in which the bulk of the magnesium is present as an oxide, may thus be treated by converting the iron associated with the magnesium oxide into the complex compound at the time of the hydration thereof. It may be pointed out that the time required for hydration of the magnesium oxide in this material is considerably greater than is required for the hydration of magnesium oxide when the hydration takes place coincidently with the hydration of the calcium oxide. Similarly, in the case of other mixtures of hydrates and oxides, the amount of ferric iron converted into the complex compound will depend upon the amount of ferric iron associated with the oxide which is hydrated during the process.

It is to be understood, however, that the true reduction reaction may take place at the same time as a portion of the ferric iron is converted into the complex compound and the ferric iron reduced to ferrous iron may be the iron which is associated with the portion of the material treated, that is already in hydrated form.

When relatively low temperatures are employed in the treatment of an oxide which hydrates relatively slowly, such as the magnesia of magnesium or dolomitic lime, by the process herein described, for example, temperatures corresponding to a pressure in the neighborhood of 20 pounds per square inch gage pressure, the treatment in the pressure vessel to bring about hydration of the oxide may require in the neighborhood of one-half hour or more, but, when relatively high temperatures are employed, for example, temperatures corresponding to several hundred pounds per square inch gage pressure, the treatment may be completed in a very few minutes, for example, two to five minutes. In the case of an oxide which hydrates relatively rapidly, for example, high calcium quick-limes, since the hydration usually takes place with greater speed, the time of treatment will be reduced as compared to that required with oxides which hydrate more slowly. When the iron content is relatively high and substantially complete conversion is desired, the use of a temperature corresponding to a pressure exceeding one hundred pounds gage pressure is generally recommended.

Regardless of whether the ferric iron is converted into ferrous iron or into a substantially colorless compound, the process may be carried out in a pressure vessel of any desired form and construction. Preferably, the process of the present invention is carried out in a pressure vessel whose capacity is such with respect to the alkaline earth oxide and water mixture that the heat generated during the hydration will create and maintain within the vessel a sufficient pressure to produce a temperature which will complete the desired conversion of the ferric iron without the application of extraneous heat. It is to be understood, however, that if a relatively large pressure vessel is employed, as compared to the volume of oxide and water so that only a relatively low pressure is created in the hydration step, the vessel may be externally heated to create and maintain the desired pressure in the vessel.

In one embodiment of the invention, the process is carried out in the equipment illustrated in the copending application of Bolton L. Corson, Serial Number 211,952, filed June 4, 1938, entitled "Process for hydrating lime," and the process herein described may also be carried out during the process described in that application. In view of the description of the process and apparatus set forth in that application, it need not be here repeated, but is embodied herein by reference. Patent No. 2,309,168 was issued January 26, 1943, on an application Serial Number 349,757, filed August 2, 1940, as a continuation-in-part of said application Serial Number 211,952.

The following examples are illustrative of the present invention wherein the ferric iron is reduced to ferrous iron:

*Example I*

A slurry composed of 2 pounds of pulverized quicklime, 1½ pounds of water, and 0.01 pound of potassium cyanide is placed in a small pressure autoclave; hydration occurs, and external heat is applied so that a pressure of 20 pounds per square inch gage pressure is obtained for a period of one-half hour; at the end of this period of time, the steam is vented off in order to remove some of the excess moisture. The product obtained is converted from its typical yellow color to a white material which contains approximately 10% free moisture.

*Example II*

The process of Example I is carried out, but with the substitution of 0.01 pound of stannous chloride for the potassium cyanide of the example.

*Example III*

A slurry composed of 5 pounds of dolomitic quicklime and 5 pounds of water containing ¼ pound of sodium sulphite is placed in a container and permitted to hydrate. Heat is applied to the mass in order that a temperature of 212° F. can be maintained for a period of two hours. At the end of this period, the lime is substantially white, having lost its original yellowish appearance.

*Example IV*

A slurry composed of 140 pounds of pulverized quicklime, 105 pounds of water and 0.7 pound of sodium arsenite is placed in a pressure chamber. In this example, the hydration is carried out solely by the heat liberated during the reaction of the quicklime with water. A gage pressure of 225 pounds per square inch is obtained and the hydration is continued at approximately this pressure for a period of twelve minutes. At the end of this time, the excess steam and some of the water is released through a vent and the product obtained is a brilliant white material containing approximately 5% free moisture.

*Example V*

A slurry composed of 300 pounds of pulverized quicklime, 234 pounds of water, and 1.2 pounds of sodium arsenite is placed in the pressure vessel described in the aforesaid co-pending application Serial Number 211,952. The hydration is carried out in three minutes' time at a pressure of 300 pounds per square inch, which is obtained from the heat of reaction. The treatment is continued for four additional minutes at the elevated pressure, at the end of which time the outlet valve is opened and the material blown out of the vessel in accordance with the method described in the aforesaid application. The hydrated lime is obtained in a dry form, and is completely bleached.

The following examples are illustrative of the present invention wherein the ferric iron is converted into a substantially colorless complex compound:

*Example VI*

A slurry composed of 2 pounds of pulverized dolomitic quicklime having a yellowish cast, 1½ pounds of water and 0.01 pounds of sulphur dioxide added in the form of an aqueous solution of sulphur dioxide gas is placed in a small pressure autoclave. External heat is applied so that a pressure of 20 pounds per square inch gage pressure is maintained for a period of one-half hour, during which hydration occurs. At the end of this time, the steam is vented off in order to remove some of the excess moisture. A substantially white hydrated lime is obtained containing approximately 10% free moisture.

Example VII

A slurry composed of 300 pounds of pulverized high calcium or dolomitic quicklime having a yellowish cast, 234 pounds of water, and 0.6 pound of sulphur dioxide introduced as an aqueous solution of sulphur dioxide is placed in the pressure vessel described in the aforesaid copending application Serial Number 211,952. A pressure of 300 pounds is obtained from the heat of the reaction in three minutes' time. The treatment is continued for four additional minutes at the elevated pressure, at which time the outlet valve is opened and the material blown out of the receptacle in accordance with the method described in the aforesaid application. The resulting lime product is obtained in a substantially dry form and is completely bleached.

Example VIII

The process of Example VII is carried out as there described, but with the substitution of 1.2 pounds of calcium or sodium sulphite for the sulphur dioxide solution of the example.

Example IX

A slurry composed of 2 pounds of calcined magnesite discolored with ferric iron, 1½ pounds of water, and .01 pound of calcium sulphite is placed in a small pressure autoclave and external heat is applied so that magnesium oxide is hydrated and so that a pressure of 100 pounds per square inch gauge pressure is maintained for a period of one-half hour. At the end of this period the steam is vented off and the product removed. The product obtained is converted from the discolored form to a bleached white material.

Example X

A slurry composed of 2 pounds of calcined magnesite discolored with ferric iron, 1½ pounds of water, and .01 pound of sodium thiosulphate is placed in a small pressure autoclave and external heat is applied so that magnesium oxide is hydrated and so that a pressure of 100 pounds per square inch gage pressure is maintained for a period of one-half hour. At the end of this period, the steam is vented off and the product removed. The product obtained is converted from the discolored form to a bleached white material.

Example XI

A slurry composed of 1 pound of magnesium hydroxide discolored with ferric iron, 2 pounds of water, and .002 pound of calcium sulphite is digested for a period of six hours at 212° F. At the end of this time, the material is substantially white having lost its original yellowish appearance.

Example XII

A slurry composed of 1 pound of calcined barium carbonate having a yellowish cast due to the presence of ferric iron, 1 pound of water, and .002 pound of calcium sulphite is placed in a small pressure autoclave externally heated and a pressure of 100 pounds gage pressure is maintained for a period of one-half hour. At the end of this period of time, the steam is vented off and the product removed. The material is converted from its typically yellow color to a bleached white product.

Example XIII

A slurry composed of 2 pounds of calcined barium carbonate having a yellowish cast due to the presence of ferric iron, 1½ pounds of water, and .01 pound of sodium sulphite is placed in a small pressure autoclave externally heated and a pressure of 100 pounds gage pressure is maintained for a period of one-half hour. At the end of this period of time, the steam is vented off and the product removed. The material is converted from its typically yellow color to a bleached white product.

Considerable modification is possible in the selection of the reagent and in the amount thereof employed, as well as in the type of equipment and physical conditions used in the process, without departing from the essential features of the invention.

I claim:

1. The process of treating an alkaline earth compound selected from the group consisting of the oxide and the hydrate, said compound being discolored by ferric iron, to form a substantially white alkaline earth hydrate which comprises mixing, with a mixture of said alkaline earth compound and water, a non-color-imparting inorganic compound selected from the group consisting of the compounds having sulphur and oxygen, phosphorus and oxygen, and arsenic and oxygen in the anion thereof, said anion being in the state of incomplete oxidation, a mercurous salt, a stannous salt, and a cyanide; subjecting said mixture to an elevated temperature above about 180° F.; and maintaining said mixture at elevated temperature to react said non-color-imparting compound with at least enough of the ferric iron originally present to form a substantially white non-color-imparting reaction product containing iron to render said product substantially white.

2. The process of treating a lime selected from the group consisting of quick-lime and hydrated lime, said compound being discolored by ferric iron, to form a substantially white lime hydrate which comprises mixing, with a mixture of said lime and water, a non-color-imparting inorganic compound selected from the group consisting of the compounds having sulphur and oxygen, phosphorus and oxygen, and arsenic and oxygen in the anion thereof, said anion being in the state of incomplete oxidation, a mercurous salt, a stannous salt, and a cyanide; subjecting said mixture to an elevated temperature above about 180° F.; and maintaining said mixture at elevated temperature to react said non-color-imparting compound with at least enough of the ferric iron originally present to form a substantially white non-color-imparting reaction product containing iron to render said product substantially white.

3. The process of treating an alkaline earth compound selected from the group consisting of the oxide and the hydrate, said compound being discolored by ferric iron, to form a substantially white alkaline earth hydrate which comprises mixing, with a mixture of said alkaline earth compound and water, a non-color-imparting inorganic compound having sulphur and oxygen in the anion thereof, said anion being in the state of incomplete oxidation; establishing with the aid of steam pressure an elevated temperature above 212° F.; and maintaining said mixture at elevated temperature to convert at least enough of the ferric iron present in the alkaline earth compound into a compound imparting substantially no coloration to the product to render said product substantially white.

4. The process of treating a lime selected from the group consisting of quick-lime and hydrated lime, said compound being discolored by ferric iron, to form a substantially white lime hydrate, which comprises mixing, with a mixture of said lime and water, a non-color-imparting inorganic compound having sulphur and oxygen in the anion thereof, said anion being in the state of incomplete oxidation; establishing with the aid of steam pressure an elevated temperature above 212° F.; and maintaining said mixture at elevated temperature to convert at least enough of the ferric iron originally present, into a compound imparting substantially no coloration to the product to render said product substantially white.

5. The process of treating an alkaline earth oxide discolored by ferric iron to produce a substantially white alkaline earth hydrate, which comprises mixing said oxide, water, and a non-coloring-imparting inorganic compound having sulphur and oxygen in the anion thereof, said anion being in the state of incomplete oxidation; hydrating said oxide under pressure and at a temperature corresponding to a steam pressure in excess of 100 pounds per square inch; and maintaining the mixture at said elevated temperature to convert at least enough of the ferric iron present in the oxide into a compound imparting substantially no coloration to the hydrate to render said product substantially white.

6. The process of treating quick-lime discolored by ferric iron to form a substantially white hydrated lime, which comprises mixing said quick-lime, water, and a non-color-imparting inorganic compound having sulphur and oxygen in the anion thereof, said anion being in the state of incomplete oxidation; hydrating said quick-lime under pressure and at a temperature corresponding to a steam pressure in excess of 100 pounds per square inch; and maintaining the mixture at said elevated temperature to convert at least enough of the ferric iron present in the quick-lime into a compound imparting substantially no coloration to the lime hydrate to render said product substantially white.

7. The process of claim 6 wherein the non-color-imparting inorganic compound furnishes an $SO_3^=$ ion.

8. The process of treating quick-lime discolored by ferric iron to form a substantially white hydrated lime, which comprises hydrating the quick-lime in a pressure receptacle in the presence of a non-color-imparting inorganic compound having sulphur and oxygen in the anion thereof, said anion being in the state of incomplete oxidation; establishing with the aid of steam pressure an elevated temperature above 212° F. during said hydration; maintaining said mixture under elevated temperature and pressure conditions to convert at least enough of the ferric iron associated with the quick-lime into a compound imparting substantially no coloration to the lime hydrate to render said product substantially white, the pressure and temperature conditions being sufficient to cause the spontaneous discharge of the hydrated lime from said pressure receptacle upon the release of said pressure and to cause the conversion of excess water into the vapor phase which passes off leaving a substantially dry hydrated lime; and releasing said pressure to cause discharge of said lime from said receptacle.

9. The process of claim 8 wherein the non-color-imparting inorganic compound furnishes an $SO_3^=$ ion.

10. A substantially white alkaline earth hydrate produced from an alkaline earth compound selected from the group consisting of the oxide and the hydrate originally containing sufficient ferric iron impurity to cause discoloration thereof, in which sufficient of said ferric iron impurity is present as the substantially non-color-imparting reaction product of said ferric iron and an added non-color-imparting inorganic compound to render said product substantially white, said added non-color-imparting inorganic compound being selected from the group consisting of compounds having sulphur and oxygen, phosphorus and oxygen, and arsenic and oxygen in the anion thereof, said anion being in the state of incomplete oxidation, a mercurous salt, a stannous salt, and a cyanide, said added non-color-imparting inorganic compound being present in the product in the oxidized state.

11. A substantially white hydrated lime produced from a lime selected from the group consisting of quick-lime and hydrated lime originally containing sufficient ferric iron impurity to cause discoloration thereof, in which sufficient of said ferric iron impurity is present as the substantially non-color-imparting reaction product of said ferric iron and an added non-color-imparting inorganic compound to render said product substantially white, said added non-color-imparting inorganic compound being selected from the group consisting of compounds having sulphur and oxygen, phosphorus and oxygen, and arsenic and oxygen in the anion thereof, said anion being in the state of incomplete oxidation, a mercurous salt, a stannous salt, and a cyanide, said added non-color-imparting inorganic compound being present in the product in the oxidized form.

12. A substantially white alkaline earth hydrate produced from an alkaline earth compound selected from the group consisting of the oxide and the hydrate originally containing sufficient ferric iron impurity to cause discoloration thereof, in which sufficient of said ferric iron impurity has been reduced to the substantially non-color-imparting ferrous reaction product of said impurity and an added non-color-imparting inorganic compound to render said hydrate substantially white, said compound containing sulphur and oxygen in the anion thereof which prior to the reaction is in the state of incomplete oxidation but is present in the product in the oxidized form.

13. A substantially white lime hydrate produced from a lime selected from the group consisting of quick-lime and hydrated lime originally containing sufficient ferric iron impurity to cause discoloration thereof, in which sufficient of said ferric iron impurity has been reduced to the substantially non-color-imparting ferrous reaction product of said impurity and an added non-color-imparting inorganic compound to render the said hydrate substantially white, said compound being selected from the group consisting of compounds having sulphur and oxygen in the anion thereof which prior to the reaction is in the state of incomplete oxidation but is present in the product in the oxidized form.

14. A substantially white alkaline earth hydrate produced from an alkaline earth compound selected from the group consisting of the oxide and the hydrate originally containing sufficient ferric iron impurity to cause discoloration thereof, in which sufficient of said ferric iron impurity is present as a substantially non-color-imparting complex compound of said impurity, alkaline earth metal and $SO_4^=$ ion obtained from added $SO_3^=$ ion to render said product substantially white.

15. A substantially white hydrated lime produced from a lime selected from the group consisting of the quick-lime and hydrated lime originally containing sufficient ferric iron impurity to cause discoloration thereof, in which sufficient of said ferric iron impurity is present as a substantially non-color-imparting complex compound of said impurity, calcium and $SO_4^=$ ion obtained from added $SO_3^=$ ion to render said product substantially white.

LEONARD JOHN MINNICK.

REFERENCES CITED

The following references are of record in the file of this patent:

UNITED STATES PATENTS

| Number | Name | Date |
|---|---|---|
| 233,916 | Bihn et al. | Nov. 2, 1880 |
| 1,032,862 | Salamon et al. | July 16, 1912 |
| 1,876,909 | Gelder | Sept. 13, 1932 |
| 1,947,952 | Nitzschke | Feb. 20, 1934 |
| 1,994,271 | Church | May 12, 1935 |
| 2,064,588 | Chubbuck | Dec. 15, 1936 |

FOREIGN PATENTS

| Number | Country | Date |
|---|---|---|
| 331,584 | Great Britain | July 7, 1930 |